United States Patent
Kaulbach et al.

(12)

(10) Patent No.: US 6,583,226 B1
(45) Date of Patent: Jun. 24, 2003

(54) FEP WITH INCREASED FLEXURAL FATIGUE STRENGTH AND A LOW LEVEL OF DIE DEPOSITS

(75) Inventors: Ralph Kaulbach, Emmerting (DE); Friedrich Kloos, Kastl (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/009,422

(22) PCT Filed: Jun. 28, 2001

(86) PCT No.: PCT/US01/20620

§ 371 (c)(1),
(2), (4) Date: Dec. 10, 2001

(87) PCT Pub. No.: WO02/04560

PCT Pub. Date: Jan. 17, 2002

(51) Int. Cl.$^7$ .............................. C08L 27/18; H01B 3/49
(52) U.S. Cl. ...................................... 525/199; 525/200
(58) Field of Search ................................... 525/199, 200

(56) References Cited

U.S. PATENT DOCUMENTS

| | | | |
|---|---|---|---|
| 2,946,763 A | 7/1960 | Bro et al. | |
| 3,085,083 A | 4/1963 | Schreyer | |
| 4,029,868 A | 6/1977 | Carlson | 526/247 |
| 4,552,925 A | 11/1985 | Nakagawa et al. | 525/200 |
| 5,688,457 A | 11/1997 | Buckmaster et al. | |

FOREIGN PATENT DOCUMENTS

| | | |
|---|---|---|
| DE | A 26 13 795 | 7/1976 |
| DE | A 26 13 642 | 1/1977 |
| DE | A 27 10 501 | 6/1977 |
| EP | 0 075 312 A | 3/1983 |
| EP | 0 088 414 A | 9/1983 |
| EP | 0 150 953 A | 8/1985 |
| EP | 0 222 945 A | 5/1987 |
| EP | 0 226 668 A | 7/1987 |
| EP | 0 362 868 A | 4/1990 |
| EP | 0 423 995 A | 4/1991 |
| EP | 0 612 803 A1 | 8/1994 |
| GB | 1 210 794 A | 10/1970 |
| WO | WO 99/41313 | 8/1999 |
| WO | WO 00/44791 | 8/2000 |

OTHER PUBLICATIONS

*Modern Fluoropolymers*, ed. John Scheirs, Wiley & Sons, 1997. p. 228.

*Primary Examiner*—Nathan M. Nutter
(74) *Attorney, Agent, or Firm*—Dean M. Harts

(57) ABSTRACT

Provided is a melt-processible perfluorinated polymer composition comprising (a) a melt-processible perfluoropolymer comprising (i) from 80 to 98% by weight of repeating units derived from tetrafluoroethylene, (ii) from 2 to 20% by weight of repeating units derived from hexafluoropropylene, and (iii) from 0 to 5% by weight of repeating units derived from further comonomers other than tetrafluoroethylene and hexafluoropropylene, and wherein the proportion by weight of the repeating units derived from hexafluoropropylene units is greater than that of the repeating units of said further comonomers, and (b) from 0.01 to 5% by weight, based on perfluoropolymer (a), of a high-molecular-weight perfluorinated polymer with a melting point at least 20° C. above that of the fluoropolymer (a). Also provided are processes for making and using such melt-processable compositions.

16 Claims, No Drawings

FEP WITH INCREASED FLEXURAL FATIGUE STRENGTH AND A LOW LEVEL OF DIE DEPOSITS

The invention relates to melt processible fluoropolymer compositions, in particular compositions that comprise a melt processible fluoropolymer comprising repeating units derived from tetrafluoroethylene (TFE) and hexafluoropropylene (HFP). Such copolymers are called "FEP".

FEP fluoropolymers have been known for a long time (U.S. Pat. No. 2,946,763), and are commercially available. FEP fluoropolymers are perfluorinated thermoplastic fluoropolymers that have excellent heat resistance and chemical resistance. FEP fluoropolymers also have a low dissipation factor (EP-A-423 995). Due to all of these properties FEP polymers are of interest for use as an insulating material for cable-wire insulation, in particular for what are known as plenum wire cables, used for example in LANs (local area networks). The processing speeds for producing insulating plenum cables are very high. FEP polymers that can be used in producing such plenum cables are therefore generally those which permit processing at high shear rates without loss of the necessary mechanical properties.

FEP polymers which have a broad molar mass distribution ensure relatively fast processing at relatively high shear rates (DE-A-26 13 795, DE-A-26 13 642, EP-A-88 414, EP-A-362 868). Modification with another comonomer (DE-A-27 10 501, EP-A-75 312), such as perfluoro vinyl ethers, yields retention of the necessary mechanical properties. To generate high extrusion speeds while retaining a smooth melt surface, nucleating agents are often added to the polymeric materials to suppress, and/or shift the occurrence of "shark skin" (melt surface instability, giving a rough surface) to higher shear rates(U.S. Pat. No. 5,688, 457).

Besides the formation of "shark skin" at high shear rate, the tendency of perfluorinated thermoplastics to form die deposits has to be considered. These die deposits are processing condition dependent, and take effect in different ways. In fast extrusion procedures, such as cable-wire insulation, large accumulations of die deposits separate from the die and cause break-off of the melt cone and thus interruption of the production, and also interruption of the continuous cable. High processing temperatures promote die deposits, and at these temperatures the FEP products decompose more rapidly, as becomes apparent through discoloration and molecular degradation. This thermal instability is attributable to unstable end groups, HFP diads in the main polymer chain (EP-A-150 953) and metal contamination. The decomposition reaction of the thermally unstable end groups has been described in "Modern Fluoropolymers", Ed. John Scheirs, Wiley & Sons 1997, page 228. For this reason thermally unstable end groups, including COOH, $CONH_2$ and COF groups, are preferably converted into thermally stable end groups by fluorination (GB-A-1 210 794, EP-A-150 953, EP-A-222 945) or by a stabilization process in the presence of water vapor (DE-A-26 13 795, DE-A-26 13 642). The amounts of die deposits can be minimized by preparing FEP materials with stable end groups, combined with high purity with respect to metal ions and narrow molecular weight distribution (German Patent Application 199 03 657.8 of Jan. 29, 1999, corresponding to PCT/EP00/00528 of Jan. 24, 2000). However, this high purity is accompanied with increased purification costs, and a narrow molecular weight distribution, which further promotes the onset of "shark skin".

When FEP polymers are melt extruded, high extrusion speeds increase deposits on the die. These deposits, known as die deposits, accumulate as time passes and break away from the die when they reach a particular size. This results in damage to the final product or, in the case of break-off of the melt, to interruption of production with other serious consequences. After a break-off production has to be interrupted until a new cable has been threaded into the die. The break-off also limits the length of the cable, thus producing unnecessary waste material in the twisting of a number of cables of different length. Die deposits of this type are therefore regularly removed from the die during processing, but this removal is almost impossible during high-speed processing, such as cable-wire insulation, and particularly in this application it had to be accepted that frequent break-offs of the melt cone would occur.

The present inventors have found that it would thus be desirable to reduce the number of times a melt cone breaks off in the extrusion of FEP polymers, in particular at high speed. Preferably, this problem is solved without sacrificing the resulting mechanical properties. Desirably, the mechanical properties of the FEP polymers are further improved.

In accordance with the present invention there is provided a melt-processible perfluorinated polymer composition comprising a) a melt-processible perfluoropolymer comprising
    (i) from 80 to 98% by weight of repeating units derived from tetrafluoroethylene,
    (ii) from 2 to 20% by weight of repeating units derived from hexafluoropropylene, and
    (iii) from 0 to 5% by weight of repeating units derived from further comonomers other than tetrafluoroethylene and hexafluoropropylene, and wherein the proportion by weight of the repeating units derived from hexafluoropropylene units is greater than that of the repeating units of said further comonomers, and
  b) from 0.01 to 5% by weight, based on perfluoropolymer a), of a high-molecular-weight perfluorinated polymer with a melting point at least 20° C. above that of the fluoropolymer a).

The invention further provides a method of producing the above melt-processible composition, the use thereof in melt-extrusion, in particular to extrude insulation around a wire to produce an electrical cable. The invention also relates to an electrical cable having the melt-processible composition as an insulation.

The inventors have recognized that the actual problem is not the die deposit itself but excessive accumulation of the same and the release of relatively large accumulations, which finally leads to break-off of the melt cone during wire coating.

A mixture of the aforementioned melt-processible perfluoropolymer with a small proportion of a high-melting, i.e. having a higher melting point than the melt-processible perfluoropolymer, and high-molecular-weight fluoropolymer, i.e. having a higher molecular weight than the melt-processible perfluoropolymer, performs quite differently than known FEP melt-processible perfluoropolymers. Under the same conditions, there is very little accumulation of the die deposits which form, since they regularly break away from the die at very short intervals. Without intending to be bound by any theory, it is believed that a possible reason for this is the presence of minor non-uniformities in the melt, which may be brought about by the high-molecular-weight, higher-melting fluoropolymer which entrains the die deposits. The use of the mixture of the melt-processible perfluoropolymer with the higher-melting, higher molecular weight perfluoropolymer for high-speed cable-wire sheathing, for example plenum wire production, may reduce by a factor of 5 the number of break-offs observed of the melt cone. This ensures continuous production with fewer interruptions to production and longer cables.

The melt-processible composition of the invention generally also permits an improvement in mechanical properties in comparison with prior art FEP polymers.

For example the flexural fatigue strength ("flex life") of the melt-processible composition of this invention is often many times greater than that of known FEP copolymer products with the same melt flow index (MFI). In the art, high flexural fatigue strengths of FEP products have hitherto been achieved by modification with perfluoro alkyl vinyl ethers (PAVEs). However, the dipole moment of PAVEs and the high dissipation factor associated with this makes these materials disadvantageous, particularly for high-frequency cable applications.

The melt-processible perfluorinated polymer composition according to the invention, may achieve comparable flexural fatigue properties without the need for any modification with PAVEs. Of course, if desired modification with PAVEs may be utilized to further improve flexural fatigue strength and elongation at break at high temperatures.

In accordance with the present invention, the melt-processible perfluorinated polymer composition comprises a melt-processible perfluoropolymer comprising from 80 to 98% by weight of repeating units derived from TFE, between 2 and 20% by weight, preferably between 7 and 16% by weight of repeating units derived from HFP and between 0 and 5% by weight of further comonomers other than TFE and HFP and wherein the proportion by weight of the HFP derived repeating units is larger than that of the repeating units derived from the further comonomers. Suitable further comonomers include PAVEs. Examples of suitable PAVE monomers include those corresponding to the formula:

$$CF_2=CF-O-R_f \quad (I)$$

wherein $R_f$ represents a perfluorinated aliphatic group that may contain one or more oxygen atoms. Preferably, the perfluorovinyl ethers correspond to the general formula:

$$CF_2=CFO(R_fO)_n(R'_fO)_mR''_f \quad (II)$$

wherein $R_f$ and $R'_f$ are different linear or branched perfluoroalkylene groups of 2–6 carbon atoms, m and n are independently 0–10, and $R''_f$ is a perfluoroalkyl group of 1–6 carbon atoms.

Examples of perfluorovinyl ethers according to the above formulas include perfluoro-2-propoxypropylvinyl ether, perfluoro-3-methoxy-n-propylvinyl ether, perfluoro-2-methoxy-ethylvinyl ether, perfluoromethylvinyl ether (PMVE), perfluoro-n-propylvinyl ether and $CF_3-(CF_2)_2-O-CF(CF_3)-CF_2-O-CF(CF_3)-CF_2-O-CF=CF_2$.

Preferably, the melt-processible perfluoropolymer of the melt-processible perfluorinated polymer composition has a melt flow index (MFI) in grams per 10 minutes (g/10 min) of more than 0.5, preferably at least 2, more preferably at least 5 when measured at 372° C. at a load of 5 kg. The melting point of the melt-processible perfluoropolymer is generally 230 to 280° C., preferably 240 to 270° C.

The melt-processible perfluorinated polymer composition further contains from 0.01% by weight to 5% by weight, preferably 0.05 to 0.5% based on the weight of the melt-processible perfluoropolymer of a high-molecular weight, higher melting perfluoropolymer. The higher melting perfluoropolymer typically has a melting point of at least 20° C. above, preferably at least 30° C., and more preferably at least 40° C. above the melting point of the melt-processible perfluoropolymer. The higher melting perfluoropolymer that is contained in the composition as a minor component, typically will have a MFI measured at 372° C. and with a load of 5 kg of not more than 0.5. Preferably, the higher melting perfluoropolymer will have a melting point of at least 270° C., preferably at least 290° C. Examples of suitable higher melting perfluoropolymers include copolymers of TFE and PAVEs, e.g. as mentioned above.

In a preferred embodiment, the perfluoropolymers of the melt-processible composition of the invention will have fewer than 70, in particular fewer than 5, thermally unstable end groups per $10^6$ carbon atoms. Thermally unstable end groups include COOH, $CONH_2$ and COF groups. These can be readily converted into more stable end groups through fluorination as disclosed in GB-A-1 210 794, EP-A-150 953 or EP-A-222 945 or by a stabilization process in the presence of water vapor as disclosed in DE-A-26 13 795 or DE-A-26 13 642.

The fluoropolymers constituting the melt-processible composition of the invention may be prepared by any of the known polymerization methods including aqueous or non-aqueous polymerization.

The melt processible compositions may be prepared by mixing the melt processible perfluoropolymer and the high molecular weight, higher melting perfluoropolymer. In particular, the composition can be prepared by mixing the dispersions of the respective perfluoropolymers or alternatively, the composition can be prepared through seed polymerization or core-shell polymerization. For example, in a seed polymerization, the higher melting, high molecular weight perfluoropolymer may be used as a seed in an aqueous emulsion polymerization for making the melt processible perfluoropolymer. As a result of such a seed polymerization, a melt-processible composition according to the invention can be directly obtained. Similarly, in a core shell polymerization, the high molecular weight perfluoropolymer may be polymerized in the first stage of the polymerization and in a subsequent stage of the polymerization, the composition of the polymerization system may be changed to produce the melt-processible perfluoropolymer. Again, a melt-processible composition according to the invention may thus be directly obtained.

The melt-processible composition is particularly suitable for producing electrical cables wherein the composition of the invention serves as an insulator. Cables with a low dissipation factor may be produced, and such cables are thus particularly suitable for high-frequency applications (e.g. 100 MHz to 10 GHz) as for example with plenum wire cables, coaxial cables for transmitting for example a television signal and "twisted pair" cables. To produce an electrical cable, the melt-processible composition of the invention is typically extruded around a central conductor. To produce a coaxial cable, an outer conductive element, for example, a metallic foil, a woven or braided composite wire or a drawn aluminum, copper or other metallic tube may be provided around the insulated cable. Typically, this outer conductive element will be encased in further protective insulation. Twisted pair cables are similar to coaxial cables in that a central conductor is surrounded by a low-loss insulation, except that a plurality, typically two, of such conductors are twisted together.

Analytical Methods:

The content of perfluorinated comonomers (U.S. Pat. No. 4,029,868, 4,552,925) and the number of end groups (EP- A-226 668, U.S. Pat. No. 3,085,083) are determined by IR spectroscopy. For this, a Nicolet Magna 560 FTIR is utilized. The total number of unstable end groups is calculated from the number of isolated and bonded COOH groups, $CONH_2$ groups and COF groups. The total number of these end groups is in all cases given below.

The MFI gives the amount of a melt in grams per 10 min which is extruded from a holding cylinder through a die by the action of a piston loaded with weights. The dimensions of die, piston, holding cylinder and weights are standardized (DIN 53735, ASTM D-1238). All of the MFIs mentioned here have been measured with a die measuring 2.1 mm in diameter and 8 mm in length, using a superimposed weight of 5 kg and a temperature of 372° C.

The flexural fatigue strength ("flex life") tests were carried out using a model 956, no. 102 device from Frank, built in 1967. Strips of film having a width 15 mm, a thickness of 0.3 mm, and a length of at least 100 mm were tested. Adhesive strips were used to hold a film sample of about DIN A5 size to the drum of a film cutter, a draw-knife system was put in place, and the cutting drum was rotated to produce strips at the preset knife separation. The strips of film were clamped into the screw clamps of the flexural fatigue (Frank) device and loaded with a suspended weight of 1529.6 g. The strips of film were flexed in the apparatus through an angle of 90° in both directions at a folding frequency of 250 double flexures per minute until fracture occurred. A counter on the device recorded the number of double flexures until fracture. The flexural fatigue strength, or flex life, of a material was the average number of double flexures until failure for three samples.

The examples below describe the invention in more detail. Percentages and ratios are based on weight unless otherwise stated.

COMPARATIVE EXAMPLE 1

25 L of demineralized water and 122 g of ammonium perfluorooctanoate in the form of a 30% strength solution were charged to a polymerization reactor whose total capacity was 40 L, provided with an impeller stirrer. Once the reactor had been sealed, alternating evacuation and nitrogen-flushing were used to remove atmospheric oxygen, and the vessel was heated to 70° C. After an evacuation stage, 11.0 bar of HFP were pumped in. The stirrer rate was set to 240 rpm.

TFE was then introduced until the total pressure had reached 17.0 bar. The polymerization was initiated by pumping in 35 g of ammonium peroxodisulfate (hereinafter APS), dissolved in 100 mL of demineralized water. As soon as the pressure began to fall, supplementary gaseous TFE and HFP were added with an HFP/TFE feed ratio of 0.11 to maintain the total pressure at 17.0 bar. The heat generated was dissipated by cooling the vessel wall, keeping the temperature constant at 70° C. After a total of 7.2 kg of TFE had been fed into the reactor the monomer feed was stopped, the pressure in the reactor released, and the reactor flushed several times with $N_2$.

The resultant 31.5 kg of polymer dispersion with a solids content of 22.8% were discharged at the base of the reactor. The dispersion was transferred to a 180 L precipitation vessel and made up to 100 L with demineralized water, mixed with 200 mL of concentrated hydrochloric acid and stirred until the solid had separated from the aqueous phase. The flocculent powder precipitated was granulated with 6.9 L of petroleum spirit, and the petroleum spirit was driven off using steam. The product was then washed six times, each time with 100 L of demineralized water, with vigorous stirring. The moist powder was dried for 12 hours in a drying cabinet under nitrogen at 200° C. This gave 7.1 kg of a copolymer which had an HFP content of 15%, a melting point of 252° C. and an MFI of 24.

The product was subjected to melt granulation and then 3 kg of product were charged to a 4 L fluorination reactor. During heating to 200° C., alternating evacuation and nitrogen-flushing were used to remove atmospheric oxygen and moisture. The reactor was then filled with a $F_2/N_2$ mixture comprising 20% of $F_2$. The reaction ran for 5 hours, and the $F_2/N_2$ mixture was renewed after each hour. During cooling from 200° C. to room temperature, alternating evacuation and nitrogen-flushing was used to remove unconverted fluorine. The resultant product had only 11 remaining thermally unstable end groups per $10^6$ carbon atoms.

COMPARATIVE EXAMPLE 2

The procedure was similar to that of Comparative Example 1, except that 8 bar of HFP were pumped in after the evacuation and 10 g of APS were employed, and the HFP/TFE feed ratio was 0.7. The resultant product had an HFP content of 6.9%, a melting point of 301° C. and an MFI of 0.01.

EXAMPLE 1

0.2% of the dispersion of Comparative Example 2, based on solids, were added into the dispersion of a product from Comparative Example 1, and the materials were then worked up together as described in Comparative Example 1. The resultant product had an MFI of 23 and had 7 remaining thermally unstable end groups per $10^6$ carbon atoms.

EXAMPLE 2

After 30 h of running time, the occurrence of melt cone break-off using the product from Example 1 at very high take-off speeds and high die temperatures and screw rotation rates was reduced by a factor of 5 over that of a comparable FEP copolymer product from Comparative Example 1. This was attributable to reduced accumulation of die deposits.

Extruder: 45 mm, L/D 30:1 with mixing head

Die: 0.965 cm

Mandrel: 0.558 cm

Copper wire: 0.0515 cm

Insulation: 0.0175 cm

TABLE 1

Cable extrusion with products from Example 1 and Comparative Example 1

|  | Example 1 | Comparative Example 1 |
|---|---|---|
| MFI (g/10 min) | 23 | 24 |
| Copper wire temperature (° C.) | 190 | 190 |
| Cone length (cm) | 5.1 | 5.1 |
| Die temperature (° C.) | 404 | 404 |
| Screw rotation rate (rpm) | 42.5 | 42.5 |
| Take-off speed (m/min) | 611 | 611 |
| Melt cone break-off after 30 h of running time | 1 | 5 |

COMPARATIVE EXAMPLE 3

Polymerization and work-up took place as described in Comparative Example 1, but to produce a lower MFI only 12 g of APS were used. The resultant product had an MFI of 6.9, a melting point of 256° C., HFP content of 14% and 4 thermally unstable end groups per $10^6$ carbon atoms.

COMPARATIVE EXAMPLE 4

Polymerization and work-up took place as described in Comparative Example 1, but to produce a lower MFI only 12 g of APS were used, and the initial charge of HFP was reduced to 10.5 bar, and perfluoro n-propyl vinyl ether (PPVE) was also fed at a PPVE/TFE feed ratio of 0.01. The resultant product had an MFI of 7.4, a melting point of 254° C., HFP content of 13.1%, PPVE content of 0.9% and 7 thermally unstable end groups per $10^6$ carbon atoms.

EXAMPLE 3

A dispersion product from Comparative Example 3 was mixed with 0.2% (based on solids) of the dispersion product from Comparative Example 2 with its MFI of 0.01, and the materials were worked up together, as described in Comparative Example 1. The resultant product had an MFI of 6.8 and 5 remaining thermally unstable end groups per $10^6$ carbon atoms.

The products from Comparative Examples 3 and 4 were compared for flexural fatigue strength with the product from Example 3. The product from Example 3 showed an improvement by a factor of 4 in flexural fatigue behavior over a standard FEP copolymer of Comparative Example 3, and had also been improved over the PPVE-modified FEP material from Comparative Example 4.

TABLE 2

Comparison of flexural fatigue strengths

|  | Cycles prior to fracture |
|---|---|
| Example 3 | 46000 |
| Comparative Example 3 | 11000 |
| Comparative Example 4 | 3000 |

What is claimed is:

1. A melt-processable perfluorinated polymer composition comprising
    a) a melt-processible perfluoropolymer comprising
        (i) from 80 to 98% by weight of repeating units derived from tetrafluoroethylene,
        (ii) from 2 to 20% by weight of repeating units derived from hexafluoropropylene, and
        (iii) from 0 to 5% by weight of repeating units derived from further comonomers other than tetrafluoroethylene and hexafluoropropylene, and wherein the proportion by weight of the repeating units derived from hexafluoropropylene units is greater than that of the repeating units of said further comonomers, and
    b) from 0.01 to 5% by weight, based on perfluoropolymer a), of a high-molecular-weight perfluorinated polymer with a melting point at least 20° C. above that of the fluoropolymer a).

2. The melt-processable composition of claim 1, wherein the melting point of the perfluorinated polymer b) is at least 30° C. above the melting point of the perfluoropolymer a).

3. The melt-processable composition of claim 1, wherein the melting point of the perfluorinated polymer b) is at least 40° C. above the melting point of the perfluoropolymer a).

4. The melt-processable composition of claim 1, wherein the perfluorinated polymer b) has a melting point above 270° C.

5. The melt-processable composition of claim 1, wherein the perfluorinated polymer b) has an MFI (372° C., 5 kg) less than about 0.5.

6. The melt-processable composition of claim 1, wherein the perfluoropolymers a) and b) have fewer than 70 thermally unstable end groups per $10^6$ carbon atoms.

7. A melt-processable perfluorinated polymer composition comprising
    a) a melt-processable perfluoropolymer comprising
        (i) from 80 to 98% by weight of repeating units derived from tetrafluoroethylene,
        (ii) from about 7 to about 16% by weight of repeating units derived from hexafluoropropylene, and
        (iii) from 0 to 5% by weight of repeating units derived from further comonomers other than tetrafluoroethylene and hexafluoropropylene, and wherein the proportion by weight of the repeating units derived from hexafluoropropylene units is greater than that of the repeating units of said further comonomers, and
    b) from 0.01 to 5% by weight, based on perfluoropolymer a), of a high-molecular-weight perfluorinated polymer with a melting point at least 20° C. above that of the fluoropolymer a).

8. The melt-processable composition of claim 7, wherein the melting point of the perfluorinated polymer b) is at least 30° C. above the melting point of the perfluoropolymer a).

9. The melt-processable composition of claim 7, wherein the melting point of the perfluorinated polymer b) is at least 40° C. above the melting point of the perfluoropolymer a).

10. The melt-processable composition of claim 7, wherein the perfluorinated polymer b) has a melting point above 270° C.

11. The melt-processable composition of claim 7, wherein the perfluorinated polymer b) has an MFI (372° C., 5 kg) less than about 0.5.

12. The melt-processable composition of claim 7, wherein the perfluoropolymers a) and b) have fewer than 70 thermally unstable end groups per $10^6$ carbon atoms.

13. A process for preparing a melt-processable composition according to claim 7 comprising forming a mixture of said perfluorinated polymer b) with said perfluoropolymer a) in such proportion that said perfluorinated polymer b) is contained in said mixture in an amount of 0.01 to 5% by weight, based on perfluoropolymer a).

14. A process for preparing a melt-processable composition according to claim 1 comprising forming a mixture of said perfluorinated polymer b) with said perfluoropolymer a) in such proportion that said perfluorinated polymer b) is contained in said mixture in an amount of 0.01 to 5% by weight, based on perfluoropolymer a).

15. The process of claim 14, wherein said mixture is formed by mixing a dispersion of said perfluorinated polymer b) with a dispersion of said perfluoropolymer a), by seed polymerization or by core-shell polymerization.

16. A process for producing an electrical cable, which comprises extruding, around a wire, a melt-processible composition according to claim 1.

* * * * *